United States Patent [19]

Engle et al.

[11] 4,326,675
[45] Apr. 27, 1982

[54] HONEY PIT FERTILIZATION SYSTEM

[75] Inventors: Carl E. Engle, Fremont; Donald Moldenhauer, Clintonville, both of Wis.

[73] Assignee: Hydro AG-Tech, Inc., St. Paul, Minn.; a part interest

[21] Appl. No.: 110,137

[22] Filed: Jan. 7, 1980

Related U.S. Application Data

[63] Continuation-in-part of Ser. No. 000,003, Jan. 2, 1979, Pat. No. 4,284,246.

[51] Int. Cl.³ .............................................. B02C 18/40
[52] U.S. Cl. .................................. 241/236; 241/101.7
[58] Field of Search ............... 241/236, 261, 101.2, 241/101.7, 280, 277, 221, 222, 295

[56] References Cited

U.S. PATENT DOCUMENTS 2,903,193  9/1959  Anderson ..................... 241/261 X
2,914,259 11/1959  Hestvik et al. ................ 241/280 X
2,981,487  4/1961  Davis ............................... 241/222

FOREIGN PATENT DOCUMENTS 2727164 12/1977 Fed. Rep. of Germany ... 241/101.7

OTHER PUBLICATIONS

Implement & Tractor, *Manure by Irrigation*, Tom Gilling, Sep. 20, 1958, pp. 36-37.

Primary Examiner—Mark Rosenbaum
Attorney, Agent, or Firm—Alter and Weiss

[57] ABSTRACT

A fertilization system using the contents of the manure pits on farms to supply the fertilizer. The system comprising a pump for forcing the contents of the manure pits either directly through the irrigation piping system to the fields or for spraying the contents of the pits onto the fields. A unique pulverizer is used between the intake pipe set in the pits and the pump to assure that the contents of the pits do not clog the pump.

4 Claims, 4 Drawing Figures

HONEY PIT FERTILIZATION SYSTEM

This is a continuation-in-part of application Ser. No. 000,003 filed Jan. 2, 1979, now U.S. Pat. No. 4,284,246, entitled Honey Pit Fertilization System, which has now been allowed.

This invention is concerned with fertilizer systems using the contents of manure pits; and more particularly, with improved fertilizer systems using a unique pulverizer in series with the pumps used in forcing the contents of the pits onto the fields for fertilization purposes.

In the past, manure pits or honey pits were emptied onto wagons which were then taken into the fields and the contents of the wagons were distributed into the field for fertilization purposes.

More recently, high pressure systems have been utilized to empty the honey pits and to distribute the contents of the honey pits onto the fields either by spraying or spreading.

The pressurized systems have not worked too well, because the pumps are continuously clogged by some of the contents of the honey pits. For example, many times refuse including feed and corn cobs find their way into honey pits. Herbaceous objects, such as corn cobs, are notorious for clogging the pumps.

Special pumps have been designed for the purpose of pressurizing systems using the contents of the honey pits to fertilize the fields. These pumps feature apertures capable of passing spherical solids up to 1¼ inches in diameter. They also utilize removable cover plates to enable access to the pump interior to make it easier to unclog the pumps. The pumps also include internal configuration designed to chop up herbaceous material, such as corn cobs. Notwithstanding the chopper devices, the pumps still tend to clog.

Some of the prior art patents showing a fertilization system include the patent to G. R. Roe, et al, which issued on June 7, 1932, as U.S. Pat. No. 1,862,238.

Roe, et al, teach the combination of adding fertilizers to an irrigation system. Roe et al, use the combination of a fertilizer container and a pump for pumping the fertilizer from the container through the irrigation system. However, Roe, et al, were not faced with the problems of herbaceous materials clogging the pumps; and thus, did not have the problems encountered by those who are using honey pits as a source of fertilizer.

The patent to Schuler, et al, (U.S. Pat. No. 2,627,155) does include apparatus for comminuting herbaceous material, such as leaves and grass and the like. While Schuler, et al, do not accomplish the comminuting of the herbaceous material in conjunction with material being pumped through an irrigation system; nonetheless, they do teach a pulverizer specifically for use in conjunction with a pump. In this patent the vanes of the impeller wheel are used for accomplishing the pulverizing action. This is similar in effect to what is being attempted with the pumps specifically designed for use in emptying the honey pits.

Another patent showing the blades of an impeller used for comminuting as well as for the pumping action is U.S. Pat. No. 3,393,942, which issued on July 23, 1968 on an invention to M. Hanoya. A separate pulverizer for use with pumps is shown in U.S. Pat. No. 3,959,897 which issued on June 1, 1976 covering an invention to W. P. May. The May pulverizer is used in connection with dredging and accomplishes its pulverizing effects through the use of large forces primarily through a crushing action. It has been found that such an action is not suited for use with herbaceous material. As a matter of fact, the forces required do not give a cost efficient crusher and because the herbaceous material is a lot more resilient than the rock material that the crusher of the May patent encounters, May's crusher is ineffective for use in a honey pit fertilization system.

Thus, while various irrigation systems are shown in the prior art, and especially designed pumps are available for use in emptying honey pits, there was no good system in the prior art available for use in pumping the contents of honey pits for fertilization purposes.

One of the reasons for the lack of such a system is the fact that the contents of honey pits contain the herbaceous refuse which have not been successfully pulverized or comminuted by the prior art systems.

Accordingly, an object of the present invention is to provide new and unique honey pit fertilization systems.

A related object of the present invention is to provide new and unique honey pit fertilization systems that are practically clog proof.

Yet another object of the present invention is to provide honey pit fertilization systems with a unique pulverizer for comminuting herbaceous materials.

Still another object of the present invention is to provide new and unique fertilization systems wherein the contents of the farm honey pits are spread throughout fields either using piping or by spraying, but also providing for preventing the clogging of the pump by use of unique pulverizing equipment.

Yet another object of the present invention is to provide honey pit fertilization systems with unique pulverizers having a plurality of parallel blades that are also parallel to the direction of flow of the material from the honey pit under the pressure provided by the pump.

A preferred embodiment of the present invention comprises a centrifugal pump attached to an intake line that is within a honey pit. Between the intake line and the pump is a unique pulverizer having a plurality of parallel circular blades turning on a shaft which is driven by the same power source driving the pump. The rotating blades are also parallel to the direction of flow of the material in the honey pit under pressure of the pump.

The output of the pump is either forced through irrigation piping or sprayed over the field. The parallel blades are ideal for pulverizing herbaceous material, such as corn cobs.

These and other objects and features of the present invention will be best understood by making reference to the accompanying drawing, wherein.

Figure 1:
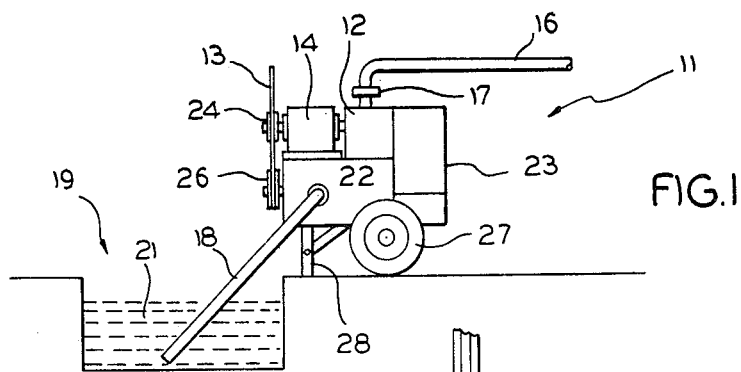
FIG. 1 is a pictorial representation of a wagon containing the pump and pulverizer coupled to the honey pit through an intake line and having an output pipe thereon.

In FIG. 1, the cart 11 comprises an assembly including a centrifugal pump 12 driven from a drive belt 13 through a gear and bearing housing 14. Pump 12 leads to an output pipe 16 through a pipe coupling 17. The pump input line 18 is dipped into the "honey" pit 19 containing manure and refuse 21 normally found in barns. The intake pipe 18 is shown as leading into a unique pulverizer assembly 22. A control box 23 may be used to control the operation of the pump and pulverizer.

It is to be noted that drive belt 13 is coupled to driven pulley 24 which leads to gear box and/or bearing arrangement 14, and also to driven pulley 26 leading to the pulverizer assembly 22. The belt 23 can come from a gas driven motor, electric motor or any other prime mover source.

It should be understood that the cart 11 can also be equipped with a gas driven motor for use as the prime mover. Further, it should be understood that cart 11, shown with wheels 27 and a support 28, could be installed permanently or could be mounted on a truck bed in which case the drive belt 13 could come from the engine of the truck. Any of the above enumerated and other types of arrangements are within the scope of the invention which contemplates and is concerned with an irrigation system including a pump and a pulverizer at the input to the pump. The pulverizer assembly depicted as block 22 is shown in greater detail in FIGS. 2 and 3.

Figure 2:
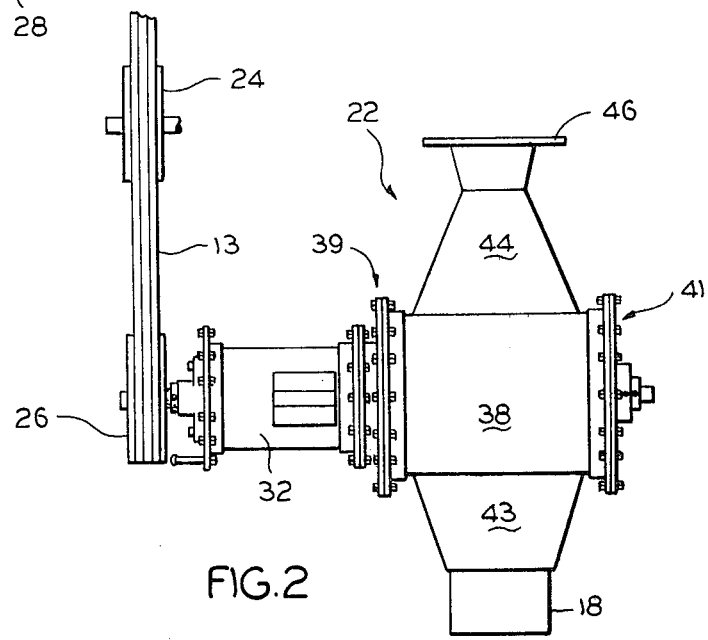
FIG. 2 is a plan view of the pulverizer showing the coupling to the drive power which also drives the pump.
Figure 3:
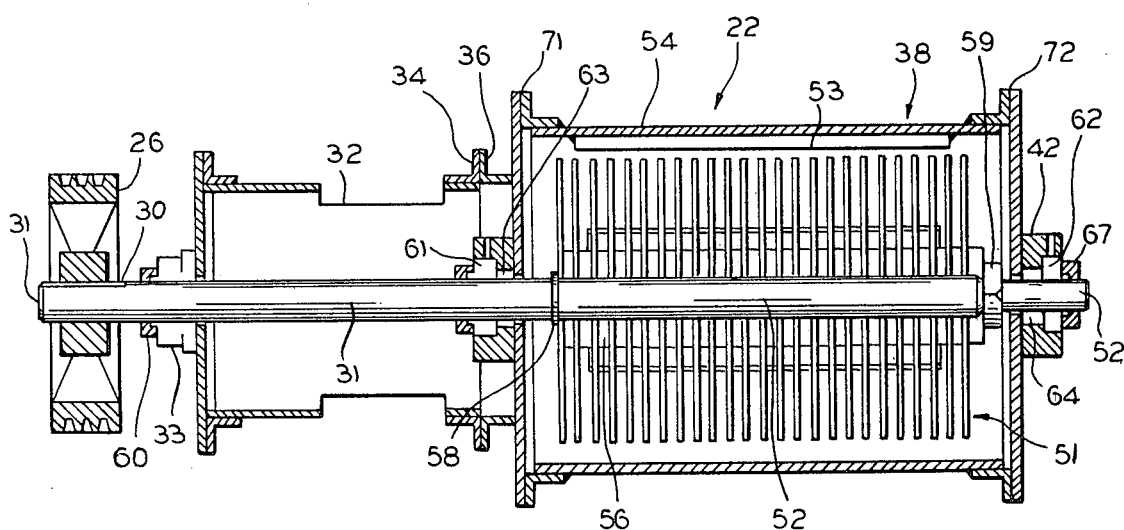
FIG. 3 is a sectional view of the pulverizer taken along the line 3—3 of FIG. 2 looking in the direction of the arrows.

In FIG. 2, for example, pulley 24 is shown as driven by belt 13, and pulley 26 is also shown driven by belt 13. As shown in FIGS. 2 and 3 pulley 26 is attached to a shaft 31 by any well known means, such as key 32. Shaft 31 is supported in a bearing 33.

Bearing 33 is supported on an end wall 34A of a housing 34, and shaft 31 is also supported in a bearing 36 supported on an opposite flanged end wall 34B of housing 34.

The pulverizer assembly 22 also includes a housing 38 shown in FIGS. 2 and 3, having end flanges 39 and 41. Flange 41 supports a bearing 42 for the extension 52 of the shaft 31 within housing 38.

Housing 38 of pulverizer assembly 22 has attached thereto an intake manifold 43 and an outlet manifold 44. Outlet manifold 44 is coupled to the intake of pump 12, the outlet being provided with a connecting flange 46 for such purpose to the intake of pump 12. Intake pipe 18 immersed in the manure pit 19 is connected directly to intake manifold 43 by any well known means.

Shaft 52 of pulverizer 22 has a plurality of blades 51 thereon. Blades 51 are designed to rotate at a speed of approximately 1200 RPM. The blades 51 are designed to rotate on the shaft 52 are closely spaced, preferably approximately 7/16 inches apart, and are secured to shaft 52 in any well known manner.

Structure is provided in the pulverizer 22 for comminuting large size solid material which has entered the housing 38 from the intake manifold 43 and the manure pit 21. To this end the interior of the housing 38 is provided with a striker bar 53 closely spaced from the periphery of the closely spaced blades 51 mounted on the shaft 52. Blades 51 are preferably in the form of ordinary toothed saw blades (about 10" in O.D.).

The rotation of the blades 51 causes the finer material and liquid material to move from intake 43 to outlet 44 by reason of the suction induced by pump 12. The rotation of blades 51 causes the larger size material to be thrown against the striker bar 53 is of the order of about 1/16" to achieve such comminution.

The blades 51 are maintained in proper spaced relationship along shaft 52 by spacers 56 mounted on shaft 52. A keeper ring 58 at one end of blade 51 and spacer 56 array together with keeper 59 at the opposite end holds the array in fixed position on shaft 52.

Housing 58 has flanges 71 and 72, flange 71 being secured to wall 34B by stitching bolts 73, and wall 41 being secured to flange 72 by stitching bolts 74.

In use, then, the system provides an intake pipe which is lowered into the pit containing the manure and other debris from the floor of the barn, and the pump and pulverizer are started. The almost liquid manure and accompanying debris are pumped through the intake to the pulverizer into the pump and out through the outlet pipe either through irrigation pipes or sprayed along the fields. The unique pulverizer destroys solids, such as corn cobs and the like; thur preventing clogging the centrifugal pump. No herbaceous matter of any consequences can traverse the pulverizer.

Figure 4:
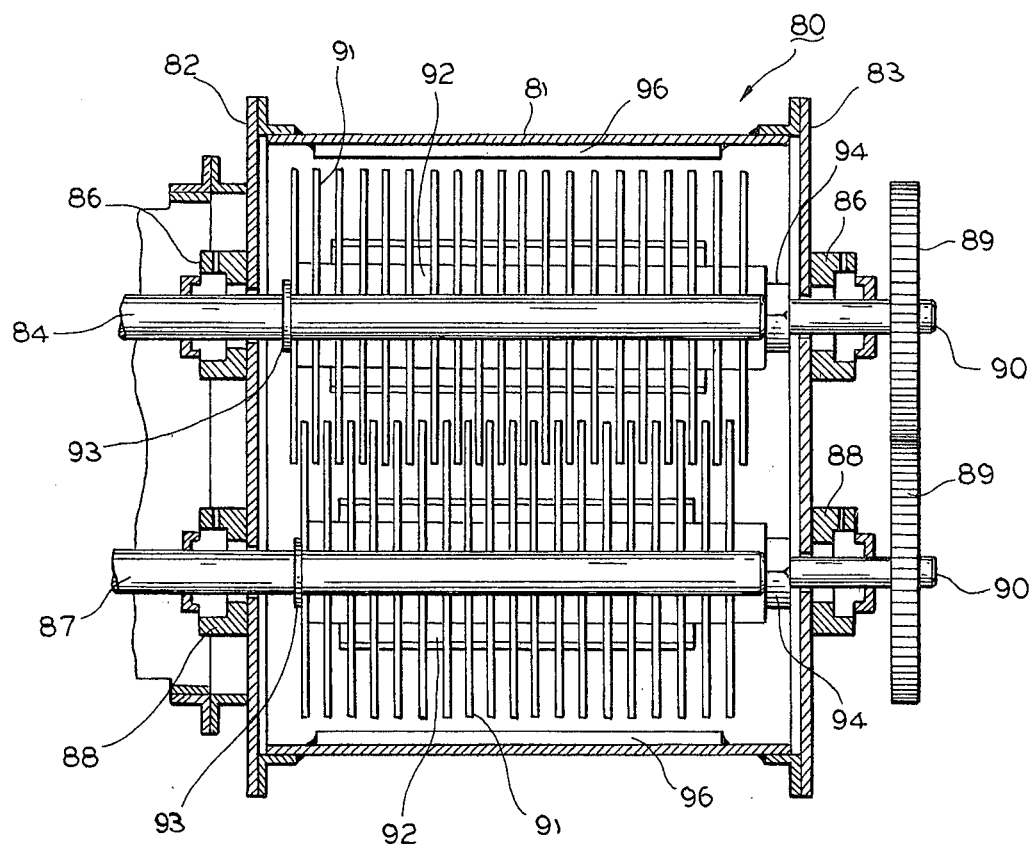
FIG. 4 is a sectional view, similar to FIG. 3, showing another form of pulverizer.

Referring now to FIG. 4 there is shown another form of pulverizer or comminutor indicated generally by the reference numeral 80. It has the advantage of providing more efficient comminution of larger size material.

Pulverizer 80 includes a housing having spaced end walls 82 and 83 with a shaft 84 supported therein in bearings 86 mounted exteriorly of the end walls 82 and 83.

A similar shaft 87 is spaced from shaft 84 and is supported in the end walls 82, 83 on bearings 88 supported exteriorly of such end walls.

The two shafts 84 and 87 are arranged to turn in counter directins by mating gears 89, each being mounted fast on a reduced diameter portion 90 of shafts 84 and 87 exteriorly of end wall 83.

As with the previous embodiment, pulverizer 80 is disposed between an intake manifold 43 and a discharge manifold 44. In this embodiment shaft 84 is driven by pulley 26 and drive belt 13.

Each of the shafts 84 and 87 has fast thereon an array of blades 91 maintained in spaced relationship by spacer members 92 also supported on their respective shafts 84 and 87. Each array is held between a collar 93 and a nut 94 threaded on the shafts 84 and 87.

The interior face of the housing 81 is provided with striker bars 96 closely spaced from the periphery of the blades 91. The two arrays of blades 91 are arranged in interdigitating relationship, so that there is a shredding of comminuting function taking place between the rotating blades 91 as well as along their peripheries at the striker bars 96.

While the principles of the invention have been described above in connection with specific apparatus and applications, it is to be understood that this description is made by way of example only and not as a limitation on the scope of the invention.

What is claimed is:

1. In a system for pumping a mixture including solid animal wastes and resilient herbaceous material from a honey pit, said mixture to be used for fertilizer, said mixture including a liquid portion, said system for the type having a pump with an inlet and an outlet, a conduit insertable into said pit to direct said mixture towards said pump inlet, the improvement comprising:
   a pulverizer assembly,
   said assembly having an inlet and an outlet,
   said assembly positioned outside said pit, in the path of flow of said mixture, with said conduit communicating with said assembly inlet and said assembly outlet communicating with said pump inlet,
   said assembly including a pair of parallel, spaced-apart shafts, each said shaft having a plurality of circular comminuting elements mounted coencentrically thereon, said elements parallel to and spaced apart from each other and from said housing to enable the liquid portion of said contents to flow between said elements to said pump inlet, said shafts being dimensioned and positioned to inter-digitate said elements on one said shaft with said elements of the remaining said shaft;

bar means positioned within said housing proximate said inlet and said outlet to impact said solids as said solids are moved by said elements, said bar means positioned parallel to said shafts and spaced apart from the outer periphery of said elements by a distance less than that of the size of solids pumpable by said pump, said assembly inlet and said assembly outlet positioned to direct the flow of said mixture transversely to said shafts and said bar means, said elements contacting said animal waste and herbaceous solids to strike said bar means to reduce said solids to a size selected to allow for passage thereof through said pump; and means communicating with said pump outlet to distribute said contents onto fields for fertilization purposes.

2. The apparatus as recited in claim 1 wherein one said shaft rotates in a clockwise direction while the other said shaft rotates in a counter-clockwise direction.

3. The apparatus as recited in claim 1 wherein said elements, when inter-digitated, are spaced apart from each other a distance less than the largest size solid that can be handled by said pump without clogging.

4. The apparatus as recited in claim 1 wherein the smallest distance between adjacent of said inter-digitated elements and said bar means is no more than the distance between adjacent of said inter-digitated elements.

* * * * *

UNITED STATES PATENT AND TRADEMARK OFFICE
CERTIFICATE OF CORRECTION

PATENT NO. : 4,326,675
DATED : April 27, 1982
INVENTOR(S) : Carl E. Engle; Donald Moldenhauer It is certified that error appears in the above-identified patent and that said Letters Patent are hereby corrected as shown below:

Col. 3, line 10      "belt 23" should be instead --belt 13--

Col. 4, line 29      "directins" should be instead --directions--

Signed and Sealed this

Sixth Day of July 1982

[SEAL]

Attest:

GERALD J. MOSSINGHOFF

*Attesting Officer*      *Commissioner of Patents and Trademarks*